(12) United States Patent
Downing

(10) Patent No.: US 11,604,261 B2
(45) Date of Patent: Mar. 14, 2023

(54) EXTENDED LASER ACTIVE RANGING SYSTEM, METHOD AND COMPUTER READABLE PROGRAM PRODUCT

(71) Applicant: LOCKHEED MARTIN CORPORATION, Bethesda, MD (US)

(72) Inventor: Andrew M. Downing, Altamonte Springs, FL (US)

(73) Assignee: LOCKEED MARTIN CORPORATION, Bethesda, MD (US)

( * ) Notice: Subject to any disclaimer, the term of this patent is extended or adjusted under 35 U.S.C. 154(b) by 1073 days.

(21) Appl. No.: 16/268,730

(22) Filed: Feb. 6, 2019

(65) Prior Publication Data

US 2020/0249323 A1 Aug. 6, 2020

(51) Int. Cl.
| | |
|---|---|
| G01S 7/481 | (2006.01) |
| G01S 7/48 | (2006.01) |
| G01S 7/497 | (2006.01) |
| G01S 17/08 | (2006.01) |
| G01S 17/89 | (2020.01) |

(52) U.S. Cl.
CPC .......... *G01S 7/4817* (2013.01); *G01S 7/4808* (2013.01); *G01S 7/497* (2013.01); *G01S 17/08* (2013.01); *G01S 17/89* (2013.01)

(58) Field of Classification Search
CPC .... G01S 7/4808; G01S 7/4816; G01S 7/4817; G01S 7/486; G01S 7/497; G01S 7/51; G01S 17/08; G01S 17/58; G01S 17/66; G01S 17/86; G01S 17/88; G01S 17/89
See application file for complete search history.

(56) References Cited

U.S. PATENT DOCUMENTS

| | | | |
|---|---|---|---|
| 3,622,788 A | 11/1971 | Briggs | |
| 5,347,387 A | 9/1994 | Rice | |
| (Continued) | | | |

FOREIGN PATENT DOCUMENTS

| | | |
|---|---|---|
| EP | 2451254 | 5/2012 |
| KR | 1020150108147 | 3/2014 |
| KR | 101665938 | 10/2016 |

OTHER PUBLICATIONS

International Search Report, KIPO, dated Mar. 10, 2020.
International Search Report, KIPO, dated Jun. 5, 2020.

*Primary Examiner* — Yuqing Xiao
*Assistant Examiner* — Benjamin Richard Hebert
(74) *Attorney, Agent, or Firm* — Terry M. Sanks, Esq.; Beusse Sanks, PLLC

(57) ABSTRACT

A system comprising non-transitory and tangible memory comprising program instructions for performing an extended laser active ranging (ELAR) procedure having a first mode and a second mode. The system includes a processor configured to execute the program instructions to cause the processor to receive selection of a region-of-interest (ROI) having a pixel cluster; and cause laser ranging using a laser ranging system in the first mode. The process is configured to determine whether a laser ranging reflection (LRR) signal is received by a laser photodetector of a gimbal during the first mode. If the LRR signal is not received, the processor performs the second mode of the ELAR procedure initialized to a center of the selected ROI to search for a reflective surface in the ROI of an imaged real-world view of an ambient scene and registered to the pixel cluster to find a small target.

20 Claims, 11 Drawing Sheets

(56) References Cited

U.S. PATENT DOCUMENTS

| | | | |
|---|---|---|---|
| 5,780,838 | A | 7/1998 | Livingston et al. |
| 5,920,394 | A | 7/1999 | Gelbart et al. |
| 5,955,724 | A | 9/1999 | Livingston |
| 5,973,309 | A | 10/1999 | Livingston |
| 6,014,922 | A | 1/2000 | Livingston |
| 6,097,481 | A | 8/2000 | Coffey et al. |
| 6,265,704 | B1 | 7/2001 | Livingston |
| 6,359,681 | B1 | 3/2002 | Housand et al. |
| 6,836,320 | B2 | 12/2004 | Deflumere et al. |
| 7,705,695 | B2 | 4/2010 | Kushta |
| 8,049,869 | B2 | 11/2011 | Flowers et al. |
| 9,864,826 | B2 | 1/2018 | Fukuchi |
| 2004/0188138 | A1 | 9/2004 | Baras et al. |
| 2006/0028373 | A1 | 2/2006 | Fullerton et al. |
| 2006/0028374 | A1 | 2/2006 | Fullerton |
| 2010/0207804 | A1 | 8/2010 | Hayward et al. |
| 2015/0192677 | A1 | 7/2015 | Yu et al. |
| 2018/0146186 | A1* | 5/2018 | Akkaya ................. H04N 13/254 |
| 2018/0164439 | A1 | 6/2018 | Droz et al. |
| 2018/0248254 | A1 | 8/2018 | Islam et al. |
| 2018/0274910 | A1 | 9/2018 | Heidemann et al. |
| 2019/0068953 | A1* | 2/2019 | Choi ........................ G01S 17/86 |
| 2019/0101623 | A1* | 4/2019 | Galera ..................... G01S 17/88 |
| 2020/0117917 | A1* | 4/2020 | Yoo ........................... B60R 1/00 |

\* cited by examiner

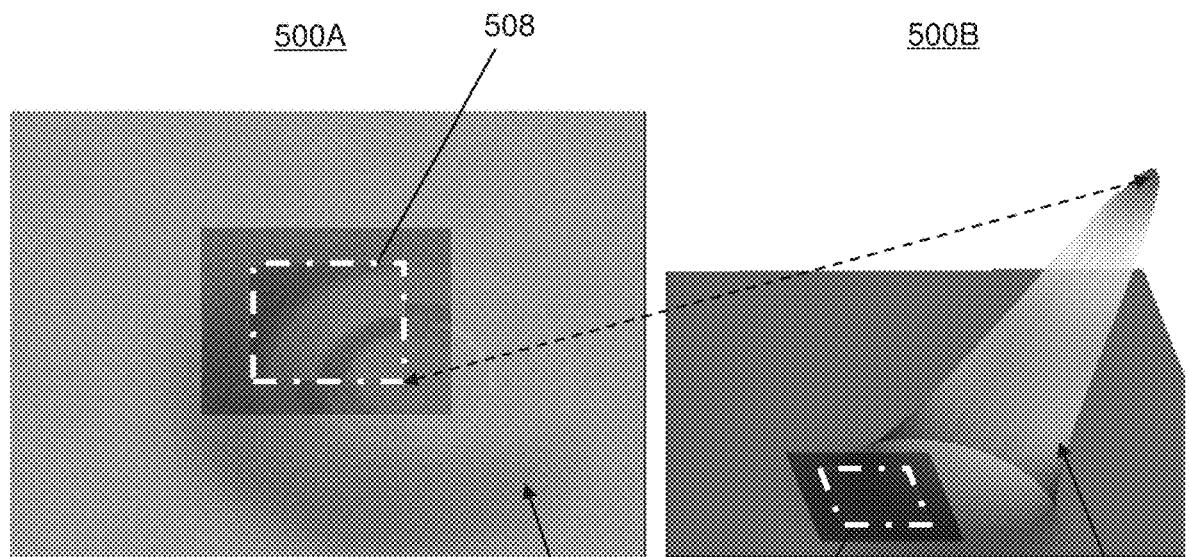
FIG. 5A
FIG. 5B
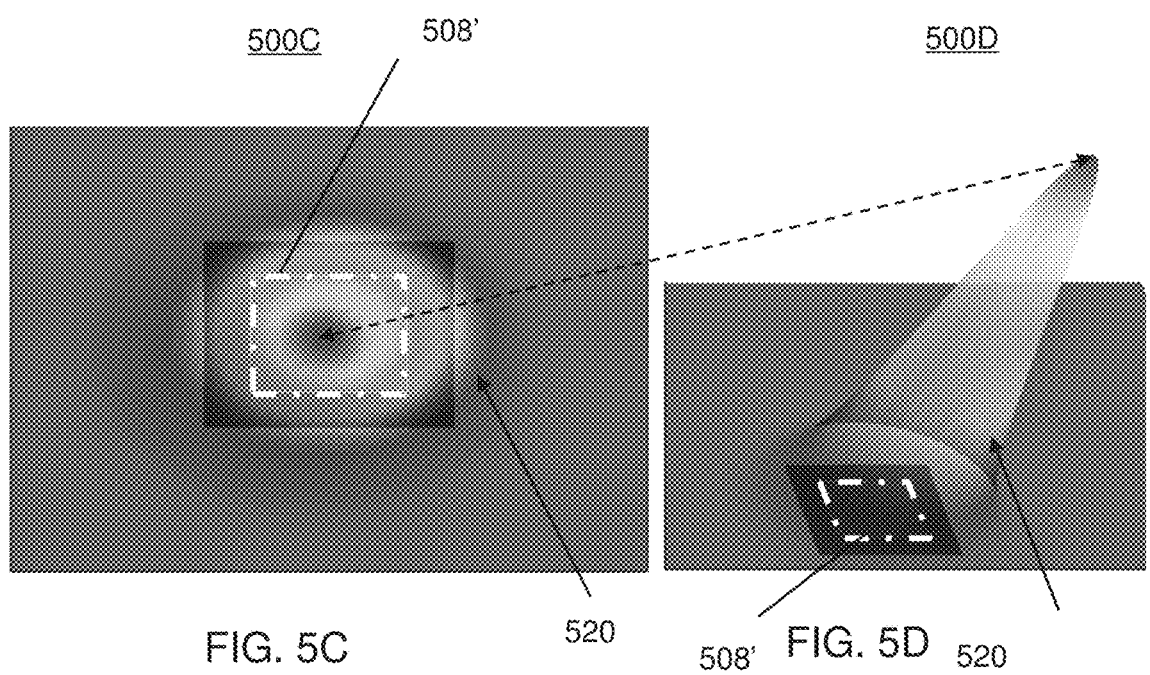
FIG. 5C
FIG. 5D

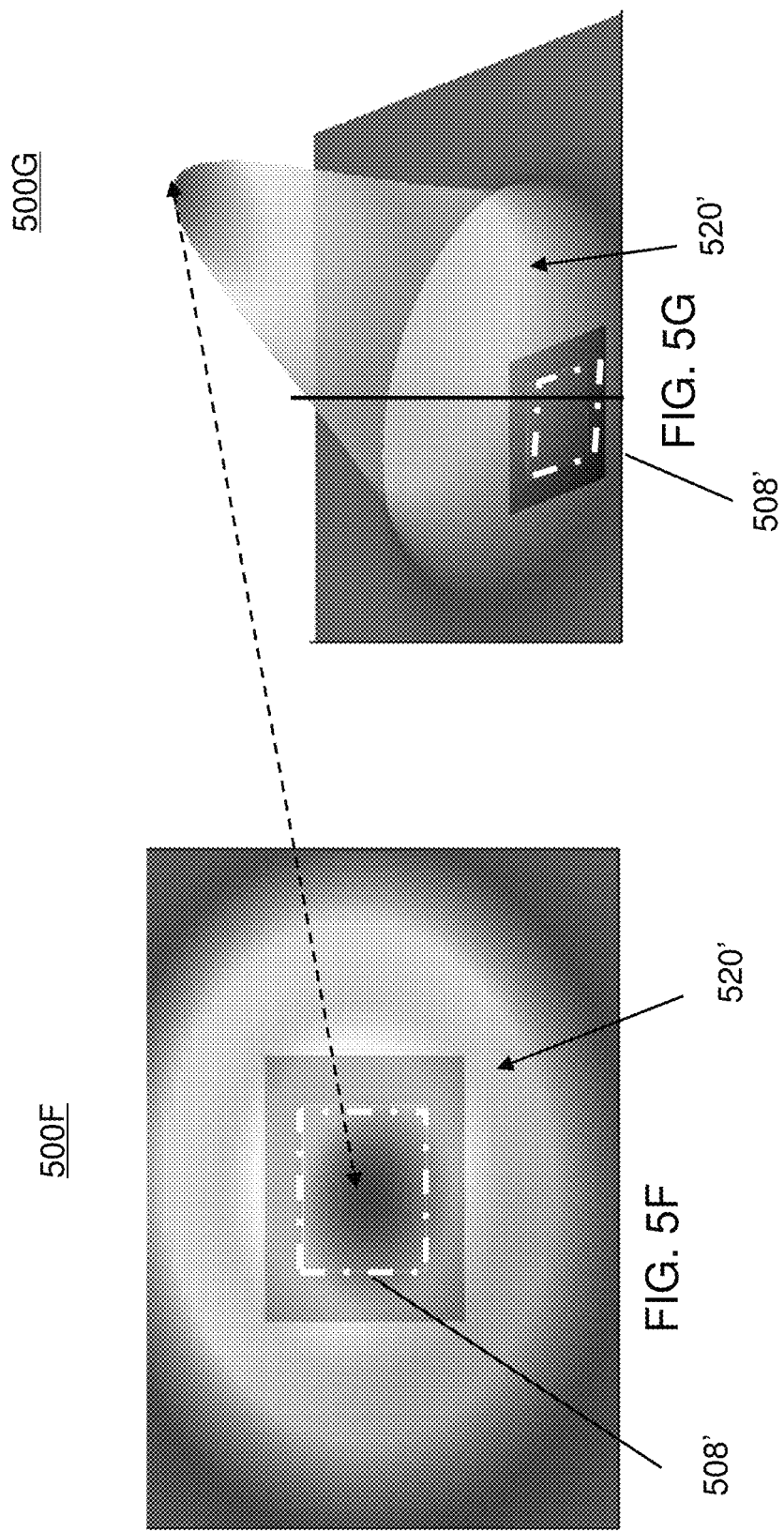

EXTENDED LASER ACTIVE RANGING SYSTEM, METHOD AND COMPUTER READABLE PROGRAM PRODUCT

BACKGROUND

Embodiments relate to extended laser active ranging system, method and computer readable program product.

Laser ranging procedures perform a search of targets using a laser ranging system and gimbal. Once a target is found, the laser ranging system and gimbal are directed to the direction of the target to receive the signals from the locked-on target. However, air vehicles are at risk because standoff ranges for a threat may output perform the capabilities of the on-board laser ranging system.

SUMMARY

Embodiments relate to extended laser active ranging system, method and computer readable program product. An aspect of the embodiments includes a system for a laser ranging system including a laser source and a gimbal having a gimbal steering device and a steerable laser photodetector for image tracking a target in a displayed image on a display device. The system comprises non-transitory and tangible memory comprising program instructions for performing an extended laser active ranging (ELAR) procedure having a first mode and a second mode. The system includes one or more processors configured to execute the program instructions to cause the one or more processors to: receive selection of a region-of-interest (ROI) having a pixel cluster; cause laser ranging aligned to an optical line-of-sight using the laser ranging system in the first mode of the ELAR procedure; determine whether a laser ranging reflection (LRR) signal is received by the laser photodetector of the gimbal during the first mode; and if the LRR signal is not received, perform the second mode of the ELAR procedure initialized to a center of the selected ROI to search for a reflective surface in the ROI of an imaged real-world view of an ambient scene and registered to the pixel cluster to find a small target.

Another aspect of the embodiments includes a non-transitory and tangible computer readable medium comprising program instructions which when executed to cause the one or more processors to: receive selection of a region-of-interest (ROI) having a pixel cluster displayed on a display device; cause laser ranging aligned to an optical line-of-sight using a laser ranging system in the first mode of an extended laser active ranging (ELAR) procedure; determine whether a laser ranging reflection (LRR) signal is received by a laser photodetector of a gimbal during the first mode; and if the LRR signal is not received, perform a second mode of the ELAR procedure, via the laser ranging system, initialized to a center of the selected ROI to search for a reflective surface in the ROI of an imaged real-world view of an ambient scene and registered to the pixel cluster to find a small target wherein the first mode is different from the second mode.

A further aspect of the embodiments includes a computer-implemented method comprising receiving, by a processor of a computing system, selection of a region-of-interest (ROI) having a pixel cluster displayed on a display device. The method includes causing, by the processor, laser ranging aligned to an optical line-of-sight using a laser ranging system in the first mode of an extended laser active ranging (ELAR) procedure; and determining, by the processor, whether a laser ranging reflection (LRR) signal is received by a laser photodetector of a gimbal during the first mode. If the LRR signal is not received, the method performs, by the processor, a second mode of the ELAR procedure, via the laser ranging system, initialized to a center of the selected ROI to search for a reflective surface in the ROI of an imaged real-world view of an ambient scene and registered to the pixel cluster to find a small target with the reflective surface. The first mode is different from the second mode.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 5A illustrates an image representative of an end view of the laser ranging profile with an initial location denoted in a dashed, dot box;

FIG. 5B illustrates an image representative of a perspective view of the laser ranging profile relative to the initial location of FIG. 5A;

FIG. 5C illustrates an image representative of an end view of the laser ranging profile with the shifted location denoted in the dashed, dot box;

FIG. 5D illustrates an image representative of a perspective view of the laser ranging profile relative to the shifted location in FIG. 5C;

FIG. 5F illustrates an image representative of an end view of a laser ranging profile with the shifted location denoted in the dashed, dot box;

FIG. 5G illustrates an image representative of a perspective view of the laser ranging profile relative to the shifted location in FIG. 5F.

DETAILED DESCRIPTION

Figure 1A:
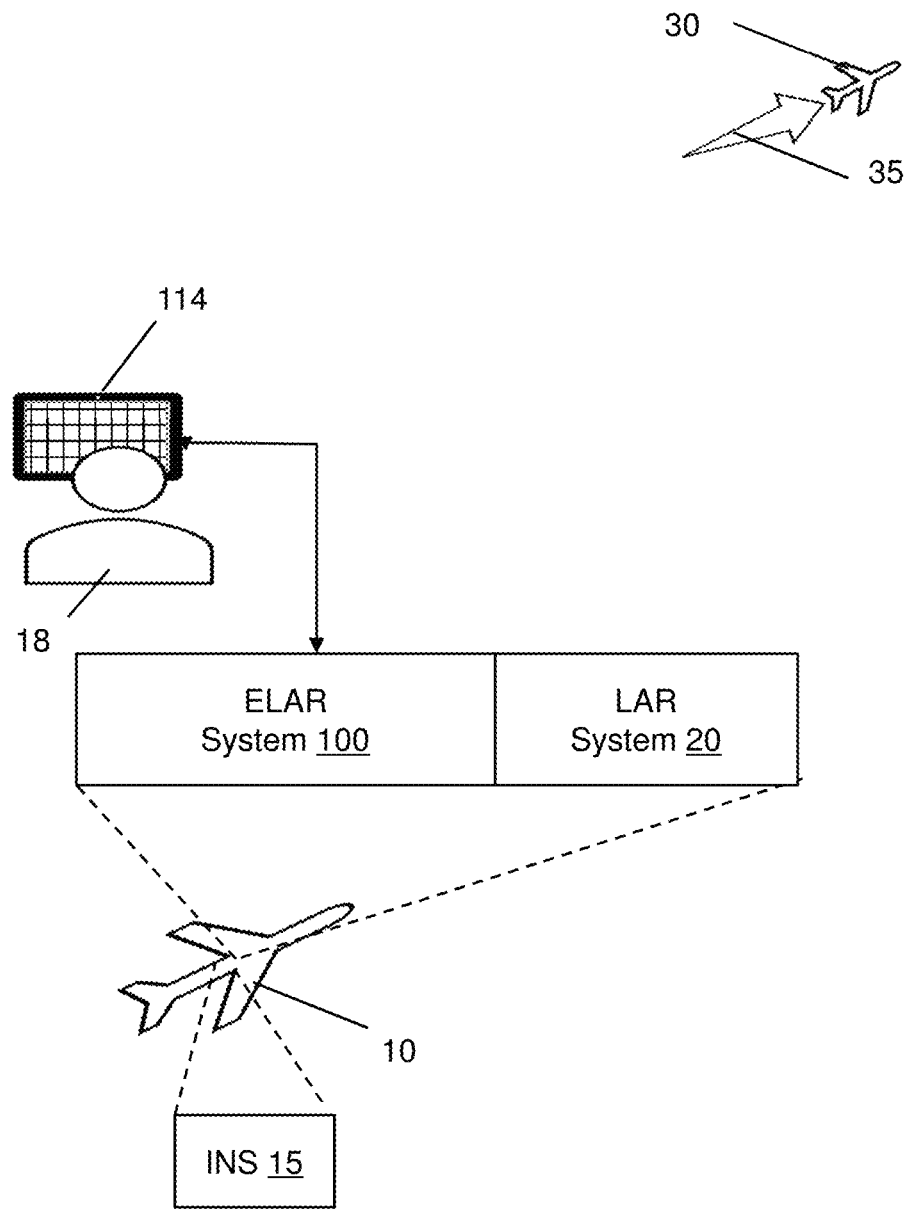
FIG. 1A illustrates a tracker vehicle with an extended laser active ranging (ELAR) system and a small target or threat.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Laser ranging of larger targets within a set range for laser ranging using image tracking is well known. However, technological advancements in air vehicles including unmanned air vehicles (UAV) of smaller size and profile has proven to be a challenge. Some UAVs can be as lethal as a tank at the same standoff range. Laser ranging relies on the reflection of the laser ranging signal from a reflective surface. Large planes, cargo planes, tanks, tankers, etc., have a large reflective surface footprint used to base the set range for laser ranging. However, UAVs can have a smaller reflective surface footprint making it difficult to perform laser ranging with existing laser ranging systems for the engineered laser source power and detector sensitivity. A UAV for the sake of disclosure herein is a small target because of its smaller reflective surface footprint. A small target may include jets which can be lethal at longer standoff ranges. Hence, when using laser ranging procedures which rely on imaging tracking, such small target may not be detected using existing laser ranging systems until the tracker vehicle is within the lethal range of the small target.

Still further, a small target may include a jet with the capability of air speed which closes the gap of the standoff range of lethality rapidly.

During imaging tracking using laser ranging, the pilot may rely on their own visual inspection of an image on a display screen. For example, during image tracking, those objects with reflective surfaces are displayed. The range of the object may also be recorded and displayed to the pilot. In a scenario, the target reflective surface of a small target, by way of non-limiting example, may be embodied as a pixel cluster of 1 to 9 pixels in the displayed image as the result of laser ranging. However, the suspicious small target of 1-9 pixels generally may not be visually observable by the pilot amongst other objects and clutter within the same image. For example, a pixel may have a size in the micrometer (μm) range.

In another scenario, during image tracking, the captured images may record the hottest infrared (IR) track of an air vehicle's exhaust while the reflective surface may remain undetectable to the unaided eye of the pilot. The hot exhaust is not the reflective surface (i.e., aircraft body) for which laser ranging relies upon for detection of a target or threat. Hence, the presence of a small target or threat may go undetected until the tracker vehicle is within the standoff range of a threat.

This vulnerable has existed for a long time and has intensified as small air-to-air threat stand-off ranges have increased to exceed in some cases the maximum laser ranging performance of the on-board laser ranging systems. Hence, a pilot may unknowingly fly towards a threat until detection through the on-board laser ranging system is possible.

FIG. 1A illustrates a tracker vehicle 10 with an extended laser active ranging (ELAR) system 100 and a second air vehicle 30 being a small target or threat to be tracked. The tracker vehicle 10 includes a vehicle body having deployed thereon an ELAR system 100, as will be described in more detail in FIG. 1B. The tracker vehicle 10 among other things may include an inertial navigation system (INS) 15 equipped with one or more of accelerometers, gyroscopes, and a global positioning system (GPS). The tracker vehicle 10 includes other components not described herein for the sake of brevity, as the description herein is directed to laser ranging of objects, targets and threats. The ELAR system 100 is shown interfaced with a display device 114 configured to be viewed by a pilot 18. The pilot 18 may be within the tracker vehicle 10 or remote from the tracker vehicle 10 such as if the tracker vehicle 10 is an unmanned air vehicle (UAV). For the sake of description, the second air vehicle 30 represents a small target or threat for which the hot exhaust 35 of the vehicle 30 may be captured by imaging.

The tracker vehicle 10 may also include a laser active ranging (LAR) system 20 configured to perform laser ranging using a laser ranging protocol for those targets or threats that can be tracked within the set laser range of the LAR system 20 with reflective surfaces visible on a display screen of a display device 114. The LAR system 20 may be a pre-existing laser active ranging system on-board the tracker vehicle 10. In some embodiments, the ELAR system 100 may piggyback on an existing on-board LAR system 20 such that common equipment is used. In other embodiments, the LAR system 20 is an ELAR system 100 configured to extend the range of the LAR system 20.

Figure 1B:
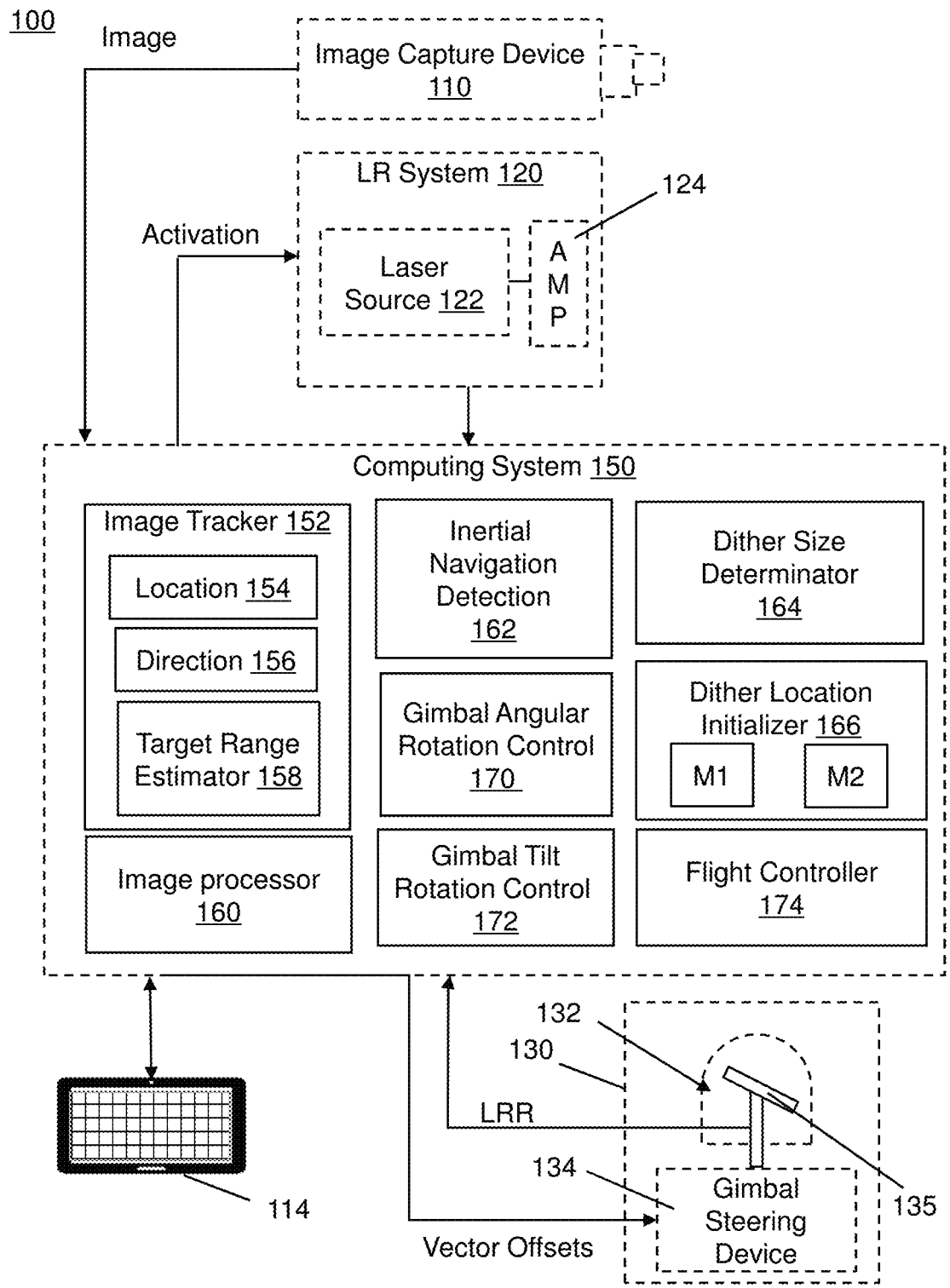
FIG. 1B illustrates a block diagram of an extended laser active ranging (ELAR) system.

FIG. 1B illustrates a block diagram of an extended laser active ranging (ELAR) system 100. The blocks shown in dashed lines represent the equipment used for laser active ranging with a set range of detection. The dashed blocks may be pre-existing and associated with the LAR system 20 or may be part of an ELAR system 100.

The ELAR system 100 may include an image capture device(s) 110 and a computing system 150. The image capture device 110 may capture images in the electromagnetic spectrum. The image capture device 110 may perform one or more of infrared (IR) imaging, visible light imaging, and ultraviolet (UV) imaging. The IR imaging may include one or more of near infrared (NIR), short wavelength infrared (SWIR) imaging, medium wavelength infrared (MWIR) imaging, long wavelength infrared (LWIR) imaging and far infrared (FIR). The visible light imaging may include red, green, blue (RGB) imaging. The image capture device 110 may be configured to output images which may be received by the computing system 150. The image capture device 110 may include one or more cameras such as thermographic cameras and RGB cameras. The thermographic camera may include infrared sensors, optics and/or a focal plane array (FPA).

The ELAR system 100 may include a laser ranging (LR) system 120 having a laser source 122. The laser source 122 may produce a Gaussian laser profile, as best seen in FIG. 5C. The LR system 120 may include one or more laser amplifier stages 124 configured to transmit a laser signal from the laser source 122. The LR system 120 may receive an activation signal from computing system 150 wherein in response to receipt of the activation signal, the LR system 120 causes the laser source 122 to emit a laser signal through one or more laser amplifier stage 124.

The ELAR system 100 may include a gimbal system 130. The gimbal system 130 may include a gimbal 132 and gimbal steering device 134. The gimbal system 130 may be configured to receive a reflection of the laser signal being reflected from a suspect target's surface. The reflection is a laser ranging reflection (LRR). A signal representative of the LRR may be sent to the computing system 150. The computing system 150 may be configured to cause the gimbal steering device 134 to orient the gimbal laser photodetector 135 to determined or calculated locations based on vector offsets such as in the direction of movement of a suspect target.

The computing system 150 will be described in more detail in relation to FIG. 6. The computing system 150 may include an image processor 160 configured to process data representative of an image received from the image capture device 110 and display such image on the display device 114. The image processor 160 may be configured to process and display the captured image based on infrared sensors and RGB or visible light sensors. The images are displayed according to the pixel resolution of the display device 114.

The system 100 may use image tracking algorithms for tracking objects based on laser ranging. The computing system 150 may include image target tracker 152 configured to track at least one of a location 154 and a direction 156 of a suspect target. The image target tracker 152 may include a target range estimator 158 configured to estimate a range of the suspect target (i.e., second air vehicle 30) relative to the tracker vehicle 10 on which the ELAR system 100 is installed. The range estimate may be determined based on the data representative of the image data.

The computing system 150 may include a dither size determinator 164. The system 100 may support a plurality of dither sizes such as without limitation a large dither size, medium dither size and a small dither size. The size of each step is a function of the laser divergence. The three sizes may be, as non-limiting examples, ⅓, ⅔ and 1λ the laser divergence. The dither size determinator 164 may be configured to determine a current dither size setting. The computing system 150 may include a dither location initializer 166. The system 100 may be configured to operate in at least two (2) modes, mode 1 (M1) and mode 2 (M2). The mode 1 may be a non-extended, default or normal LAR mode which requires an LRR signal of a predetermined threshold or greater to be received. In some embodiments, the LRR signal received in mode 1 is a non-small target. In other words, mode 1 is the mode of operation of the LAR system 20 operating within a set range with the gimbal laser photodetector 135 steered in certain pattern based on the target tracked and the attitude, orientation and flight of the vehicle 10. Mode 2 operation is an extended LAR mode configured to extend the range of the laser ranging by initiating an extended search using laser ranging based on one or more pixels in a cluster representing a thermal object or anomaly, for example. Mode 1 may be a default LAR mode with no location offset or may use the last left LAR offset.

The dither location in mode 1 may be based on an active laser ranging procedure searching or tracking objects or targets with reflective surfaces within the set range of the LAR system 30. The dither location initializer 166 may be configured to generate location data to control the gimbal steering device 134. The location initializer 166 in mode 2 includes sub-modes 2A and 2B to provide a set of coordinates or offset vectors associated with the image to steer the gimbal via a gimbal angular rotation control 170 and a gimbal tilt rotation control 172 according to the extended search associated with sub-modes 2A and 2B.

The computing system 150 may include an inertial navigation detector 162 to determine the attitude and orientation of the vehicle based on data from the INS 15 wherein the attitude and orientation as well as the data associated with the ROI, allows the computing system 150 to determine the gimbal angular rotation and the gimbal tilt rotation necessary for steering the gimbal to improve receipt of an LRR signal from a suspect small target. The computing system 150 may include a flight controller 174 configured to control the flight of the vehicle and make any adjustments to the gimbal tilt rotation and/or gimbal angular rotation.

The computing system 150 may automatically select the ROI based on predetermined criteria for which the extended search would begin. By way of non-limiting example, the predetermined criteria may include image data representative of a thermal spot in the field of view of the image capture device 110. Another example may include an operator selecting a ROI in a displayed image wherein the ROI may be representative of a thermal spot or hot zone. In some embodiments, the thermal spot or hot zone may be distinguished with a color coding, such as without limitation, red. Using a user interface, the operator may select the ROI on the display screen and select activation of a laser active ranging inquiry. The ROI may be selected to include some or all of the pixels in the pixel cluster 405. In some embodiments, the suspect target may be moving away from the tracker vehicle.

The ROI may be selected based on other criteria. For example, the image may display an indicator of a potential reflective surface which is smaller than a pixel cluster of a predetermined number of pixels. For example, the predetermined number of pixels of a pixel cluster may be in the range from 1-9. The range may be from 1-15 and 1-20 pixels, by way of non-limiting example.

In some embodiments, for those areas in an image where a predetermined small number of pixels represent a small reflective surface, the computing system 150 may automatically highlight, call-out or indicate such a small area in the image for which a reflection may have been received. However, because the number of pixels representing a received LLR signal for the location in the image relative to the ambient scene of the real-world view is relatively small such as in the micrometer range, the presence of a reflective surface may not be visible to the operator. Hence, the computer system 150 may identify within any one image, both thermal hot zones and small pixel clusters where an LRR signal was previously received during the normal laser active ranging. The ELAR system 100 may allow the pilot to select a particular one ROI for which to perform the ELAR procedure if multiple imaged areas are suspicious.

The methods described herein may be performed in the order shown or a different order. Some of the blocks of the method may be performed contemporaneously. Some steps may be added or deleted.

Figure 2:
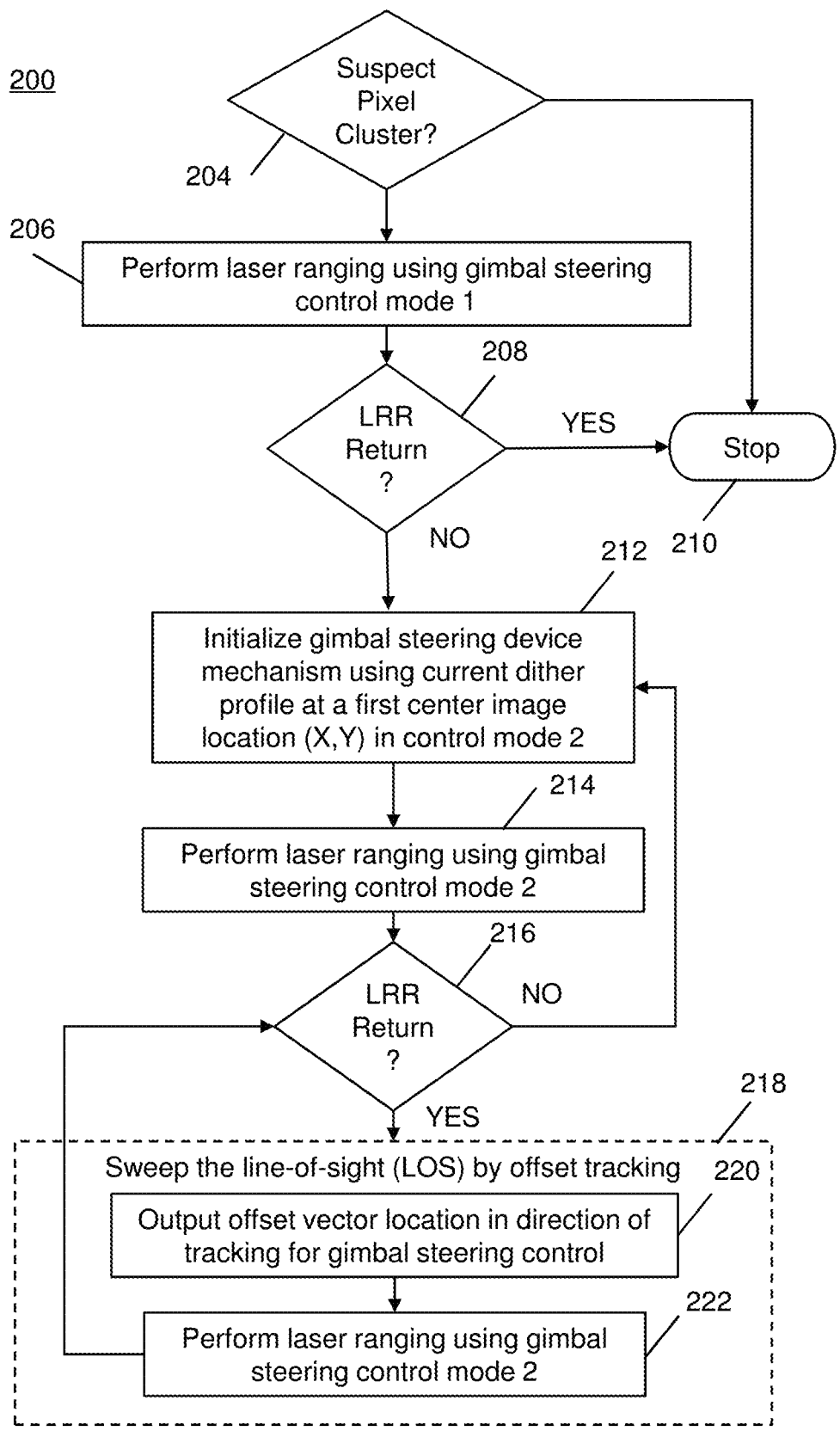
FIG. 2 illustrates a flowchart of the method for extended laser active ranging (ELAR).
Figure 4A:
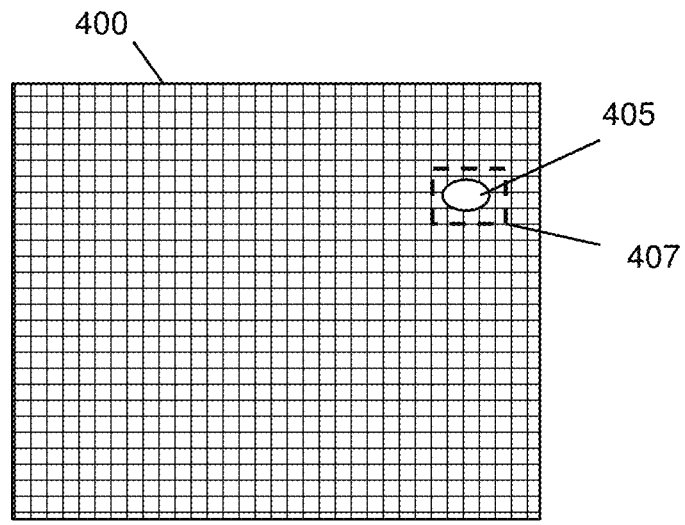
FIG. 4A illustrates an initial image with a suspect pixel cluster.

FIG. 2 illustrates a flowchart of the method 200 for extended laser active ranging (ELAR). The method 200 may include the ELAR procedure. The method 200 of FIG. 2 will be described in relation to FIGS. 4A-4D. The method 200 may include, at block 204, determining whether suspect pixels are identified. The suspect pixels may be identified by the computing system. In other embodiments, the computing system 150 may receive an input selection, by a pilot, via a user interface of a region of interest within the currently displayed image. FIG. 4A illustrates an initial image 400 with a pixel cluster 405. Assume that the dashed box around the pixel cluster 405 is a display indictor representing selection of the suspect pixel cluster 405 and may represent a region-of-interest (ROI) 407. The ROI 407 may be created using a user interface by the operator or alternately by the computing system 150 interacting with the display device 114. The method 200 may be configured to require manual selection by the pilot of an ROI region with a suspect pixel cluster for which to begin the ELAR procedure.

The suspect pixel cluster may be autonomously selected based on a thermal criterion or a pixel area maximum (PAM) denoting a received laser ranging reflection within a small cluster of pixels. The pixel cluster may be displayed on a display device on a thermal scale of infrared imaging. The thermal criterion may be within a certain thermal range captured by the image capture device.

A pixel cluster may be collection of adjacent pixels having an area not greater than the PAM. If the system 100 is set for a PAM of 9 pixels, then the range may be 1-9, by way of non-limiting example. If the PAM is 15 pixels, for example, then the range may be 1-15. The small target may be a target or threat with a small reflective surface footprint. The small target may be a large target or threat with a large reflective surface footprint but based on the range of the target relative to the tracker vehicle 10, the target can appear small within the image. The image may distinguish as a function of display pixels associated with the thermal criteria such as with infrared imaging. Additionally, the image may distinguish those pixels which represent a received LRR signal at that location registered in the image of the ambient scene of the real-world view. For example, the large target because of its current range from the tracker vehicle 10 may embody up to (no more than) the PAM number of pixels in the currently displayed image. Accordingly, the term "small target" is not intended to limit the tracked target to any size. The appearance of a "small target" in an image is a function of the vehicle size of the "small target" and its distance or range from the tracker vehicle 10, and specifically, the image capture device 110.

If the determination at block 204 is "NO," the method 200 may stop at block 210. If the determination at block 204 is "YES," the method 200 may include, at block 206, performing laser ranging using mode 1 aligned to an optical line-of-sight. The laser ranging using the mode 1 may be based on an operator or autonomously selected suspect region-of-interest (ROI).

At block 208, the method 200 may include determining whether an LRR signal was returned (i.e., detected). If the determination is "YES," the method 200 may stop at block 210. In other words, an extended laser active ranging procedure is not required. Instead, the system 100 may perform laser active ranging in a non-extended or normal mode 1.

Figure 4B:
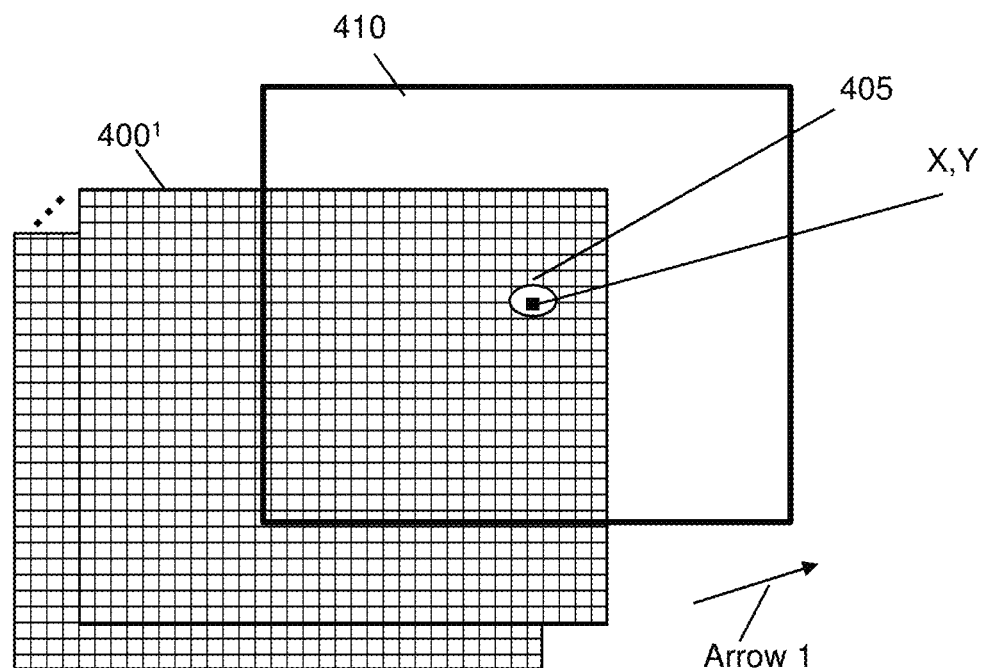
FIG. 4B illustrates a plurality of images with an image area being centered on the selected suspect pixel cluster and initialized to a first location (X,Y) for steering the gimbal when performing the ELAR procedure.

At block 208, if the determination is "NO," the method 200 may initialize the gimbal steering device 134 using a current dither profile and a determined dither size for identifying a determined starting point. FIG. 4B illustrates images $400^1$-$400^X$ with image area 410 being centered on the selected suspect pixel cluster 405 and initialized to a first location or starting point (X,Y) for steering the gimbal, when performing the ELAR procedure. The dither size is associated with the gimbal offset. If the target has an estimated laser range, the dither size setting is selected as a function of the range, such as without limitation, a small dither size setting for longer range targets, medium dither size setting for mid-range targets and a large dither size setting for short range targets. If no range is estimated, then the size may start with a small dither size, then a medium dither size and followed by a large dither size until a laser return is found.

The starting point is set as a first center image location (X,Y). The first center image location (X,Y) may be based on the selected ROI 407 either by pilot or computer system. In other words, the boresight is adjusted so that the angular rotation and tilt rotation of the gimbal is steered to coincide with the first center image location, as shown in FIG. 4B. The images $400^1$-$400^X$ may be used to identify a direction of movement of a suspect target or the pixel cluster 405. The image $400^1$ is the current image. The other images may be previously captured images which can be used to extrapolate or determine the direction of movement of the suspect target or the pixel cluster 405. For the sake of illustration, assume that arrow 1 denotes the determined direction of movement.

At block 214, the method 200 may include performing extended laser ranging using mode 2 wherein the gimbal device 130 is adjusted to continue a search for an LRR signal from a suspect target with a reflective surface based on the first center image location (X,Y).

At block 216, the method may include determining whether an LRR signal is returned (i.e., detected). In other words, the LRR signal would be over a predetermined threshold set for the extended active laser ranging procedure. If the determination is "NO," the method 200 may loop back to block 212 wherein the method 200 may repeat steps 212 and 214 using the mode 2 procedure. The blocks 212, 214 and 216 may be steps of a sub-mode 2A of the mode 2. The threshold may be based on a SNR (Signal to Noise Ratio) of the existing system. There is no change of the SNR for LAR or ELAR. The threshold is the same, the offset vector and dithering size may be varied.

Figure 4C:
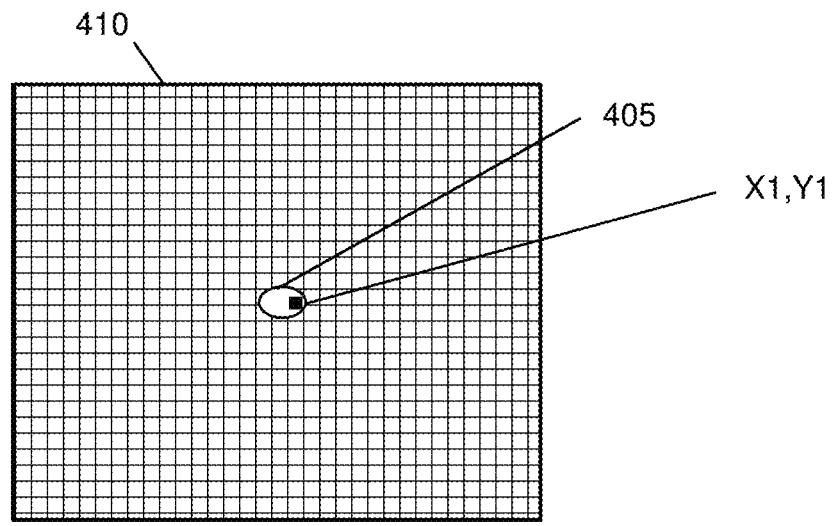
FIG. 4C illustrates the image area of FIG. 4B with the location (X1,Y1) being a second location for steering the gimbal when performing the ELAR procedure.

If the determination at block 216 is "YES," meaning an LRR signal over a predetermined threshold for extended laser ranging was received, then the method 200 may proceed to extended laser active ranging of sub-mode 2B of mode 2. In sub-mode 2B, the method 200 may sweep the line-of-sight (LOS) by offset vector tracking at block 218. The sweeping operation includes generating an offset vector location in the direction of tracking the suspect target, based on image tracking and the LRR signal, at block 220. At block 222, the laser ranging is performed using the mode 2. The LOS sweeping is configured to expand an area of search in the direction of movement of the selected pixel cluster in the ROI. FIG. 4C illustrates the image area 410 with the location (X1,Y1) being a second location for steering the gimbal when performing the ELAR procedure. The second location (X1,Y1) or offset vector being selected based on the direction of movement of the suspect target or pixel cluster 405. The second location is represented by a black dot within the pixel cluster 405. The offset vector takes small steps to hunt in the pixel cluster for a reflective surface, for example.

As a point of clarity, the first location is the center of the image area 410. The black dot is intended to represent a second location. However, the black dot may be inside or outside of the pixel cluster 405 based on the dither size setting. By way of non-limiting example, a large dither size setting may cause the second location, denoted by the black dot, to be outside of the pixel cluster, and a small dither size setting may cause the second location to be within the pixel cluster, as shown.

Figure 4D:
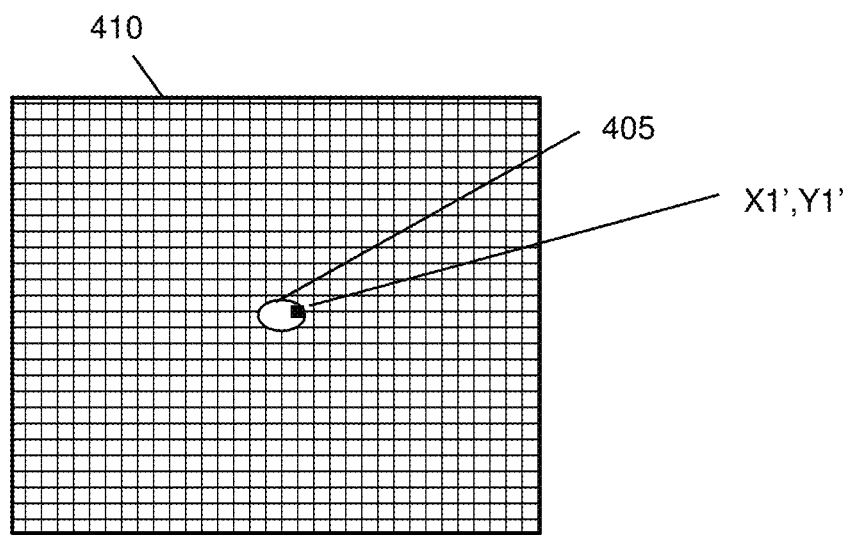
FIG. 4D illustrates the image area of FIG. 4B with the location (X1',Y1') being a second location for steering the gimbal when performing the ELAR procedure.

Block 222 may loop back to block 216. Block 216 was previously described in detail. Block 218 may be repeated autonomously or based on operator selection such that a subsequent vector offset is determined for location (X1', Y1'). FIG. 4D illustrates the image area 410 with the location (X1',Y1') being a second location for steering the gimbal when performing the ELAR procedure.

The method 200 may be configured to sweep the line-of-sight (LOS) by offset tracking to increase the probability of a laser ranging reflection (LRR) off of a reflective surface, if any, of a suspect target. The sweeping of the LOS by offset tracking may continue until the LRR signal is not returned. The extended laser ranging procedure will hunt and search for the suspect target once a sufficient extended LRR signal is received. The method 200 may sweep the LOS to find more than just one point at which the LRR signal is returned. The method 200 may be configured to generate a predetermined number of small-step vector offsets based on image processing to generate offsets, for example, in the direction of travel of a suspect target to incrementally build a reflective surface profile of the suspect target.

In some embodiments, the flight of the tracker vehicle 10 may be altered to move in the direction of an identified suspect target. In such an instance, the laser active ranging (LAR) system 20 may take over the laser ranging operations under mode 1.

In an embodiment for air-to-air laser ranging, the laser ranging reflection off the suspect target is key parameter to get as much energy accurately on the suspect target as possible. Vector offsets communicated to the gimbal steering device controls the steering of the gimbal laser photodetector 135 which may improve the probability of reception of an LRR signal. The method 200 allows laser ranging over longer distances without increasing the laser output power or the need for more expensive or sensitive detectors.

Figure 3A:
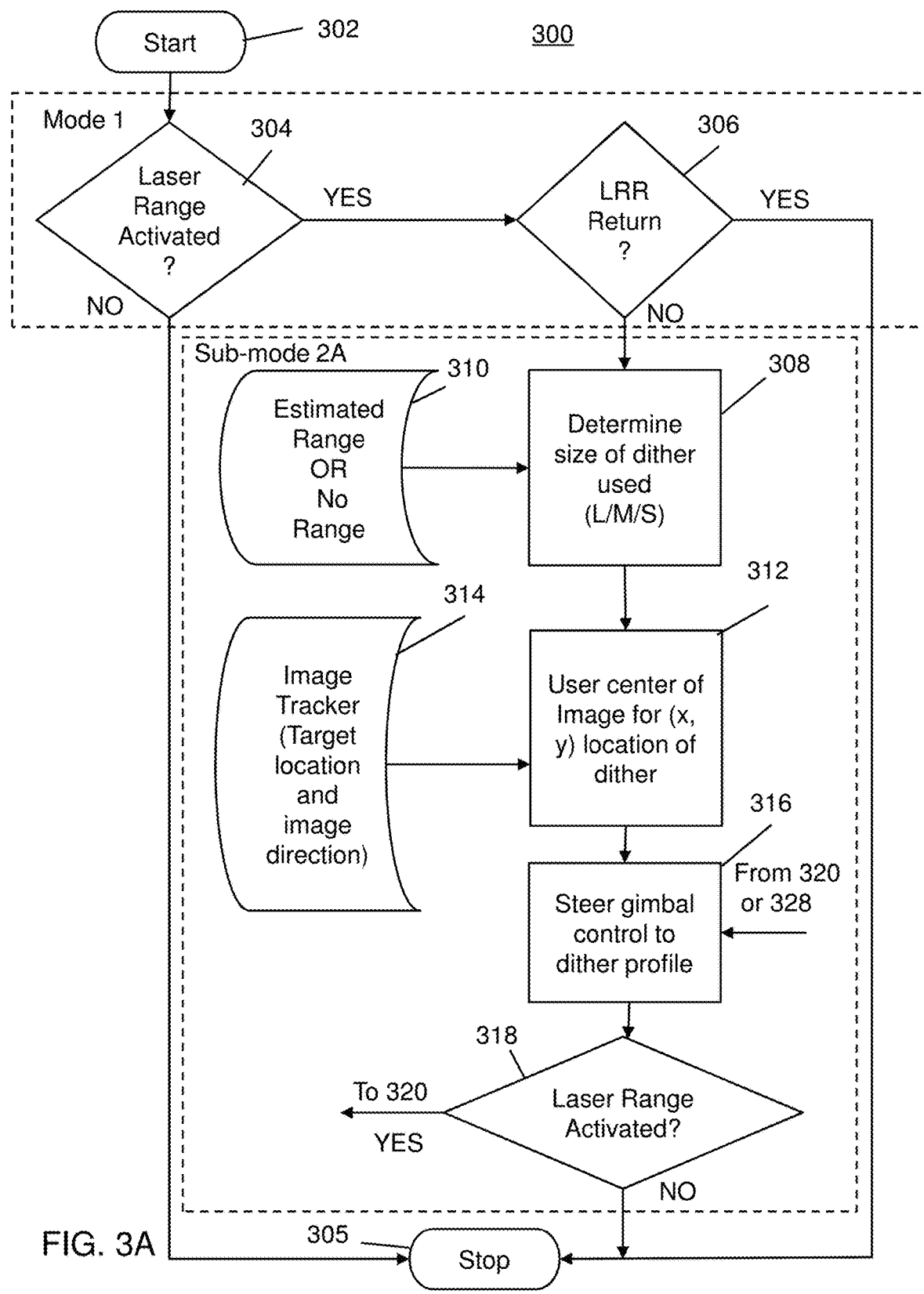
FIGS. 3A and 3B illustrate a flowchart of the method for extended laser active ranging (ELAR) for small targets.
Figure 3B:
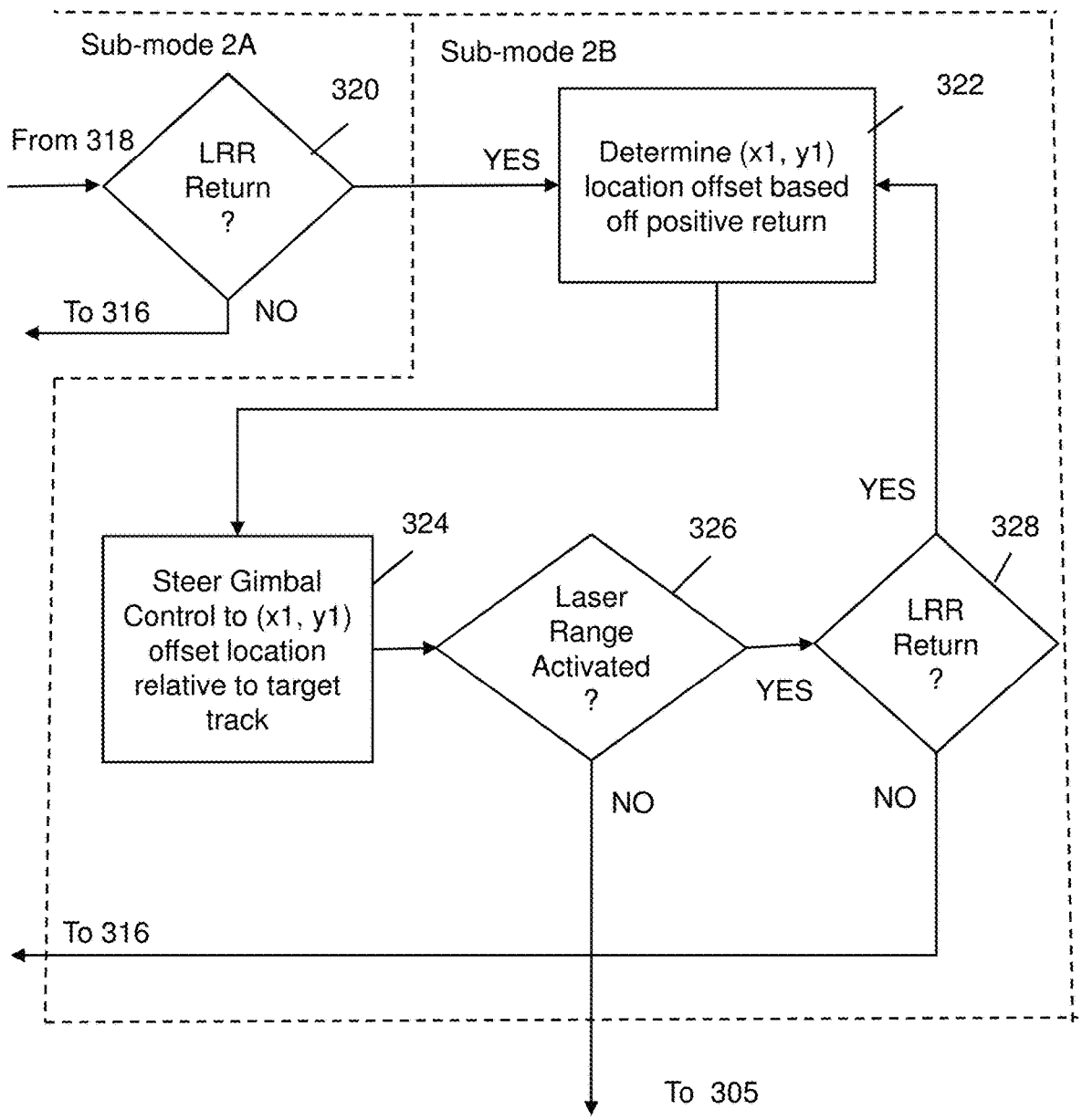

FIGS. 3A-3B illustrate a flowchart of the method 300 for extended laser active ranging (ELAR) for small targets. At block 302, the method 300 may start. At block 304, the method 300 may include determining whether laser ranging is activated. In some embodiments, laser ranging may be activated autonomously, or operator selected. If at block 304, the determination is "NO," the method 300 is stopped at block 305. However, if the determination is "YES," the method 300 may determine whether an LRR signal is returned at block 306. If the determination is "YES," the method 300 is stopped at block 306. This ends the laser ranging control mode 1. If the determination at block 306 is "NO," the method begins a laser ranging control mode 2. At block 308, the method 300 may determine a size of a dither used in mode 1. The size of the dither applied to the gimbal may be a function of the estimated range, at block 310, from the tracker vehicle to the suspect vehicle. In some embodiments, there may be no range estimate, at block 310. For example, a range may not be capable of being determined. At block 312, the method 300 may use a center of the current image for a first location (X,Y) of the dither. At block 314, the image target tracker may determine the location, and direction of the suspect target relative to the tracker vehicle. The first location (X,Y) may be a function of the determined location and direction of travel of the suspect target.

The physical range to a target can be estimated by other systems on the aircraft (such as without limitation a RADAR system), or through a monocular passive ranging maneuver. An estimated target range may be prone to math errors and less accurate than LAR. If the target has an estimated laser range, the dither size setting is selected as described above. If no range is estimated, then the dither size setting starts with a small dither size setting. When the small dither pattern is finished then the medium dither pattern is started and then large dither size until a laser return is found. If the target is still not found, the process may be repeated.

At block 316, the method 300 may include steering the gimbal steering device 134 using the first location (X,Y) and using a dither profile based on the selected dither size setting. At block 318, a determination is determined whether laser ranging is activated. In some embodiments, laser ranging may be activated autonomously, or operator selected. If at block 318, the determination is "NO," the method 300 is stopped at block 305. However, if the determination is "YES," the method 300 may determine whether an LRR signal is returned at block 320 of FIG. 3B. If the determination at block 320 is "NO," the method 300 loops back to block 316. This repeats the laser ranging control mode 2. If the determination at block 320 is "YES," the method 300 proceeds to laser ranging control mode 3 wherein at block 322, the method 300 determines an offset vector location (X1,Y1) based on the positive LRR signal returned. At block 324, the gimbal is steered using the offset vector location (X1,Y1). At block 326, a determination is made regarding whether laser ranging is activated. In some embodiments, laser ranging may be activated autonomously, or operator selected. If at block 326, the determination is "NO," the method 300 is stopped at block 305. However, if the determination is "YES," the method 300 may determine whether an LRR signal is returned at block 328. Different laser profiles may be selected. Laser beams can have a variety of cross-sectional shapes. However, atmospheric dispersion changes the shape of the laser beam to look more Gaussian. The initial shape of the laser beam is not maintained as it propagates to the target, is reflected from a reflective surface, and propagates back to the laser range receiver.

Assume for the purposes of discussion, a circular dither profile was used which works well for a gaussian laser beam. However, the dither profile for scanning may include, without limitation, an oval pattern, a square pattern, a triangle pattern, a star pattern or any other 2-dimensional shape dither profile.

If the determination at block 328 is "NO," the method 300 loops back to block 316. This re-starts the laser ranging control mode 2. If the determination at block 328 is "YES," the method 300 repeats the laser ranging control mode 3 by looping back to block 322. Those blocks returning to block 316, restarts ranging operations from the X,Y location because ranging from X1,Y1 is no longer receiving a valid return. Accordingly, the reflective surface may have moved and needs to be found again. In some embodiments, restarting the ranging, at block 316, may cause the dither size setting to change.

Figure 5E:
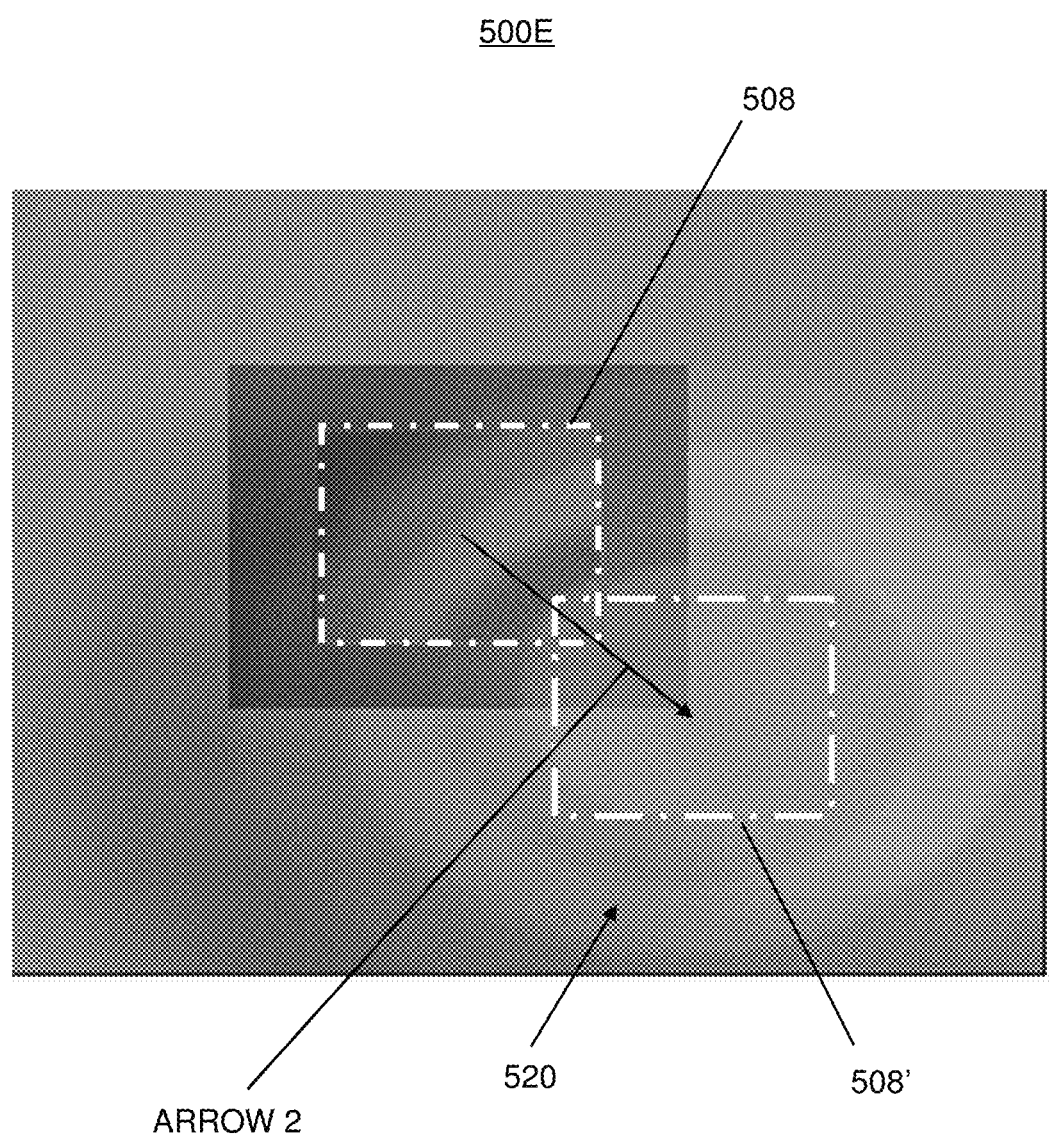
FIG. 5E illustrates an image representative of the laser ranging profile with the initial location and shifted location denoted in FIGS. 5A and 5C.

The inventor has determined that the data analysis shows that reflective surfaces and IR tracks may not be co-located in small IR targets. Thus, dither and offset tracking tools may be used in the ELAR procedure wherein increasing the laser area on a target gives a range increase on small targets. FIGS. 5A-5E illustrate an example of the offset vector tracking accomplished by the ELAR procedure described herein. FIGS. 5F-5G illustrate a dither laser profiled relative to the profile of FIGS. 5A-5D.

The FIGS. 5A-5G illustrate how a laser field size grows through the atmosphere. The laser field in FIG. 5G is larger at a 1.8× ranging profile. FIG. 5A illustrates a laser field at 1.5× the laser ranging profile. FIGS. 5A and 5G illustrate the physical effect of atmospheric dispersion of light. The shifting of the lasers field is a function of the dithering according to the dithering size setting. The embodiments herein may vary the laser field size for ranging applications.

FIG. 5A illustrates an image 500A representative of an end view of the laser ranging profile 520 (i.e., laser field size) with an initial location denoted in a dashed, dot box 508. FIG. 5B illustrates an image 500B representative of a perspective view of the laser ranging profile 520 relative to the initial location of FIG. 5A. Assume for the purposes of discussion, the box 508 is a portion of a reflective surface of a target. As can be seen in the image 500A or 500B, the box 508 may be in the line of sight (LOS) of a field portion of the ranging laser profile which has less energy as a result of the Gaussian laser profile. Thus, when ranging in a normal laser active ranging mode, the returned LRR signal may be weaker as a result of the weaker energy field portion of the impinging laser.

FIG. 5C illustrates an image 500C representative of an end view of the laser ranging profile 520 with the shifted location denoted in the dashed, dot box 508'. FIG. 5D illustrates an image 500D representative of a perspective view of the laser ranging profile 520 relative to the shifted location in FIG. 5C. Assume that the box 508 of FIG. 5A-5B has been shifted based on dithering in the direction of movement of a suspect target located in the real world and registered to the ROI (FIG. 4B) to form box 508'. Box 508' representative of a reflective surface of a suspect target. Thus, during ranging, the Gaussian laser profile may be moved such that a stronger energy field portion of the impinging laser can be received and reflected from the centered box 508'. The term "centered" in this context is for illustrative purposes. The number of increments to move the box 508 to the location of box 508' may require more than one step increment to shift the location of box 508 to the location of box 508'. In some instances, the box 508' may never actually reach the center of the Gaussian laser profile 520. In other instances, the ELAR procedure when centering the laser ranging on the center of the ROI may cause the gimbal to be steered to improve the probability of return of the LR signal from a reflective surface. Furthermore, the laser energy may be formed such that the center of the laser profiled (i.e., Gaussian laser profile) is directed to a registered area representative of approximately the center of the ROI.

The ELAR procedure of methods 200 or 300 is configured to diverge from normal laser ranging and move the laser profile around in a designated ROI to investigate a suspicious area or anomaly in a currently displayed image, for example, to seek if the suspicious area is a suspect target or threat. Upon finding a suspect target or threat, the pilot may control a flight path either toward or away from the suspect target or threat.

FIG. 5E illustrates an image 500E representative of an end view of the laser ranging profile with the initial location and shifted location denoted in FIGS. 5A and 5C. The arrow 2 may denote the determined or calculation direction of movement of the pixel cluster in the ROI.

FIG. 5F illustrates an image 500F representation of an end view of a laser ranging profile 520' with the shifted location denoted in the dashed, dot box 508'. FIG. 5G illustrates an image 500G representation of a perspective view of the laser ranging profile 520' relative to the shifted location in FIG. 5F. Assume that the laser ranging profile 520 of FIGS. 5A-5D is a small dithered size. As illustrated, the laser ranging profile 520' is larger such that the area of the Gaussian bell shape is larger. Hence, the laser ranging profile 520' is larger than the size of laser ranging profile 520. The laser ranging profile 520 may require a small dither size for the ELAR procedure. Then, the laser ranging profile 520' may use medium or large dither sizes. By way of non-limiting example, the description herein provides three dither sizes, small, medium and large. However, the dithered size may be selected from 2 or more options up to some limit. For example, the ELAR procedure may use a small and large dither size settings. The ELAR procedure may include small, medium, large and very large dither size settings, by way of non-limiting example.

The ELAR procedure of the method 200 or 300 may be used for laser range path correction (LRPC) wherein the ROI becomes a selected ROI on an already identified target. During flight of the tracker vehicle 10, the ROI can be updated manually or autonomously. The LRPC provides the pilot or computer system a tool to make adjustments to the laser active ranging, dynamically. The laser and gimbal are dynamically steered to a pilot-selected ROI using the ELAR procedure, described herein.

The LRPC may be used as a tool by the pilot or computer system to correct the flight path of the tracker vehicle 10. For example, a location in the displayed image may be a destination. The pilot or computer system may select a ROI around the destination location so that the tracker vehicle 10 may arrive at the destination location, such as without the need for GPS assistance. The destination location may be a location of a target.

Laser range path correction may be configured to compensate for the errors that build up as the laser propagates from source to target using gimbal steering. Laser range path correction may be configured to compensate for non-cooperative targets that do not have ideal reflective surfaces.

Computational Hardware Overview

Figure 6:
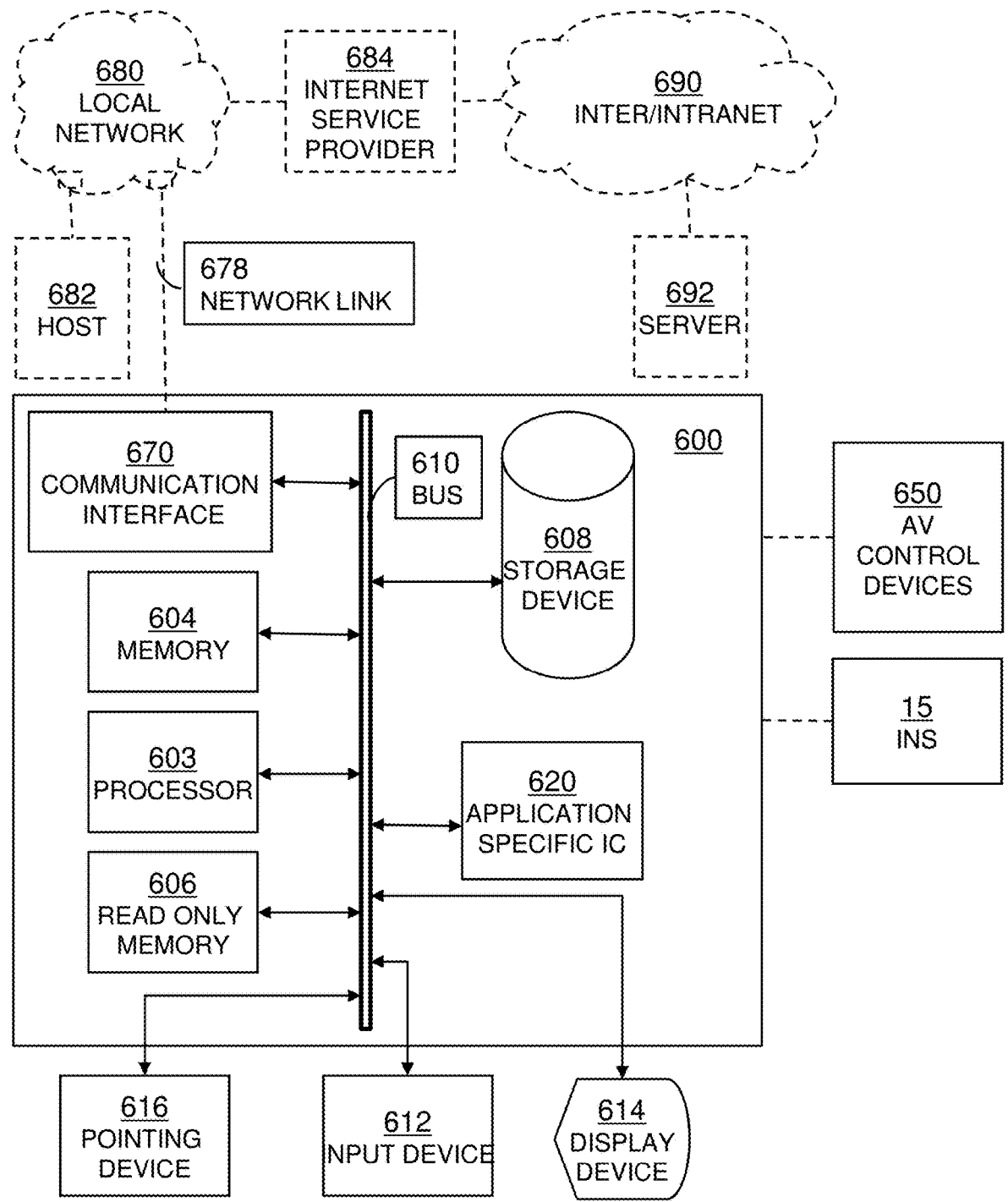
FIG. 6 illustrates a block diagram of a computing system in a network.

FIG. 6 is a block diagram that illustrates a computer system 600 (i.e., computer system 150) upon which an embodiment of the invention may be implemented or employed. Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of one or more methods described herein.

A sequence of binary digits constitutes digital data that is used to represent a number or code for a character. A bus 610 includes many parallel conductors of information so that information is transferred quickly among devices coupled to the bus 610. One or more processors 603 for processing information are coupled with the bus 610. A processor 603 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 603 constitutes computer instructions.

Computer system 600 also includes a memory 604 coupled to bus 610. The memory 604, such as a random access memory (RAM) or other dynamic storage device, stores information including computer instructions. The memory 604 may also include dynamic memory which allows information stored therein to be changed by the computer system 600. RAM allows a unit of information stored at a location called a memory address to be stored and retrieved independently of information at neighboring addresses. The memory 604 is also used by the processor 603 to store temporary values during execution of computer instructions. The computer system 600 also include a read only memory (ROM) 606, non-volatile persistent storage device or static storage device coupled to the bus 610 for storing static information, including instructions, that is not changed by the computer system 600. The ROM 606 may be a secure byte-addressable memory (storage) device or a direct-access for files (DAX) memory device. The bus 610 may also have coupled thereto other storage devices including a non-volatile (persistent) storage device, such as a magnetic disk or optical disk, for storing information, including instructions, that persists even when the computer system 600 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into signals compatible with the signals used to represent information in computer system 600. Other external devices coupled to bus 610, used primarily for interacting with humans, include a display device 614, such as a cathode ray tube (CRT) or a liquid crystal display (LCD), light emitting diode (LED) displays, for presenting images, and a pointing device 616, such as a mouse or a trackball or cursor direction keys, for controlling a position of a small cursor image presented on the display device 614 (i.e., display device 114) and issuing commands associated with graphical elements presented on the display 614.

In the illustrated embodiment, special purpose hardware, such as an application specific integrated circuit (IC) 620, may be coupled to bus 610. The special purpose hardware may be configured to perform operations not performed by processor 603 quickly enough for special purposes. Examples of application specific ICs include graphics accelerator cards for generating images for display device 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a two-way communication coupling to a variety of external devices that operate with their own processors, such as printers, scanners and external disks. For example, the communication interface 670 may interface with air vehicle-control devices (AV-CDs) 650 which control the flight of the air vehicle 10. AV-CDs 650 may include. such without limitation, canards. The communication interface 670 may be interfaces with the INS 15 whose signals may be used for flight control, AV position determination, AV orientation, AV attitude, etc.

In general, the computer system 600 through the communication interface 670 may be coupled with a network link 678 that is connected to a local network 680 to which a variety of external devices with their own processors are connected. In some embodiments, the local network 680 may be a private network and may include wired and/or wireless communications. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 may be a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 670 sends and receives electrical, acoustic or electromagnetic signals, including infrared and optical signals, that carry information streams, such as digital data.

The term computer-readable medium is used herein to refer to any medium that participates in providing information to processor 603, including instructions for execution. Such a medium may take many forms, including, but not limited to, non-volatile media, volatile media and transmission media. Non-volatile media include, for example, optical or magnetic disks, such as storage device. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 603, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 603, except for carrier waves and other signals.

Logic encoded in one or more tangible media includes one or both of processor instructions on a computer-readable storage media and special purpose hardware, such as ASIC 620.

Network link 678 typically provides information communication through one or more networks to other devices that use or process the information. For example, network link 678 may provide a connection through a private or local network 680 to a host computer 682, such as a secure host computer. For example, in some embodiments, the pilot may be located at the host computer 682. Thus, the user interfaces referenced in FIG. 6, may be located with the host computer 682.

In some embodiments, the computer system 600 may connect to equipment 684 operated by an Internet Service Provider (ISP) or Intranet Service Provider. ISP equipment 684 in turn provides data communication services through the public, world-wide packet-switching communication network of networks now commonly referred to as the Internet 690 or alternately over an Intranet. A computer called a server 692 connected to the Internet or Intranet provides a service in response to information received over the Internet or Intranet. For example, server 692 provides information representing video data for presentation at display 614 or the server may receive information representing video data for display at a location remote from the AV 10.

The invention is related to the use of computer system 600 for implementing the techniques described herein. According to one embodiment of the invention, those techniques are performed by computer system 600 in response to processor 603 executing one or more sequences of one or more instructions contained in memory 604 to form a computer program product. Such instructions, also called software and program code, may be read into memory 604 from another computer-readable medium such as storage device 608. Execution of the sequences of instructions contained in memory 604 causes processor 603 to perform the method steps described herein. In alternative embodiments, hardware, such as application specific integrated circuit 620, may be used in place of or in combination with software to implement the invention. Thus, embodiments of the invention are not limited to any specific combination of hardware and software.

Computer program code for carrying out operations described above may be written in a variety of programming languages, including but not limited to a high-level programming language, such as without limitation, C or C++, for development convenience. In addition, computer program code for carrying out operations of embodiments described herein may also be written in other programming languages, such as, but not limited to, interpreted languages. The program code may include hardware description language (HDL) or very high speed integrated circuit (VHSIC) hardware description language, such as for firmware programming. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server 692 transmits program code for a particular application, requested by a message sent from computer 600, through Internet 690, ISP equipment 684, local network 680 and communications interface 670. The received code may be executed by processor 603 as it is received or may be stored in storage device 608 or other non-volatile storage for later execution, or both. In this manner, computer system 600 may obtain application program code in the form of a signal on a carrier wave.

Various forms of computer readable media may be involved in carrying one or more sequence of instructions or data or both to processor 603 for execution. For example, instructions and data may initially be carried on a magnetic disk of a remote computer such as host computer 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red a carrier wave serving as the network link 678. An infrared detector serving as communications interface 670 receives the instructions and data carried in the infrared signal and places information representing the instructions and data onto bus 610. Bus 610 carries the information to memory 604 from which processor 603 retrieves and executes the instructions using some of the data sent with the instructions. The instructions and data received in memory 604 may optionally be stored on storage device 608, either before or after execution by the processor 603.

The memory 604 may have stored thereon applications implemented as software or computer instructions. The applications when executed by the processor 603 may perform one or more functions as described herein. For example, the applications may include instructions for gimbal angular rotation control; gimbal tilt rotation control; AV flight control; and inertial navigation detection, such as described in relation to FIG. 1B. The gimbal angular rotation control and gimbal tilt rotation control send control signals to control motor (not shown) to control the roll or angular rotation of the gimbal device and motor to tilt the laser photodetector 135 as necessary. The flight control controls the flight of the vehicle 10 such as to arrive at a destination, track a target or to a location yet to be determined.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

I claim:

1. A system for a laser ranging system including a laser source and a gimbal having a gimbal steering device and a steerable laser photodetector for image tracking a target in a displayed image on a display device, the system comprising:
   non-transitory and tangible memory comprising program instructions for performing an extended laser active ranging (ELAR) procedure having a first mode and a second mode;
   one or more processors configured to execute the program instructions to cause the one or more processors to:
      receive selection of a region-of-interest (ROI) having a pixel cluster;
      cause laser ranging aligned to an optical line-of-sight using the laser ranging system in the first mode of the ELAR procedure;
      determine whether a laser ranging reflection (LRR) signal is received by the laser photodetector of the gimbal during the first mode; and
      if the LRR signal is not received, perform the second mode of the ELAR procedure initialized to a center of the selected ROI to search for a reflective surface in the ROI of an imaged real-world view of an ambient scene and registered to the pixel cluster to find a small target.

2. The system of claim 1, wherein the pixel cluster is represented on the display device as image data representative of a thermal scale of infrared imaging.

3. The system of claim 1, wherein the pixel cluster is represented on the display device as image data representative of a laser reflection in the imaged real-world view of the ambient scene.

4. The system of claim 1, wherein the selected ROI is selected on a basis of laser range path correction (LRPC) wherein the ROI becomes a selected ROI on the target.

5. The system of claim 1, wherein the program instructions to further cause when executed the one or more processors to, during mode 2:
   determine a direction of movement of the pixel cluster of the selected ROI by image tracking; and
   further sweep a line-of-sight (LOS) of an area in or around the selected ROI to expand an area of search of reflective surface portions in the determined direction of movement using the laser ranging system.

6. The system of claim 5, wherein the program instructions to further cause when executed the one or more processors to, during mode 2:
   estimate a range of the pixel cluster in the selected ROI as registered in the image;
   in response to the estimated range, determine a dither size for conducting laser ranging in the second mode, by the laser ranging system; and
   conduct laser ranging based on the determined dither size and a dither profile.

7. The system of claim 1, wherein the laser ranging in the second mode is initialized to steer the laser photodetector of the gimbal to the center of the ROI.

8. A non-transitory and tangible computer readable medium comprising program instructions which when executed to cause the one or more processors to:
   receive selection of a region-of-interest (ROI) having a pixel cluster displayed on a display device;
   cause laser ranging aligned to an optical line-of-sight using a laser ranging system in the first mode of an extended laser active ranging (ELAR) procedure;
   determine whether a laser ranging reflection (LRR) signal is received by a laser photodetector of a gimbal during the first mode; and
   if the LRR signal is not received, perform a second mode of the ELAR procedure, via the laser ranging system, initialized to a center of the selected ROI to search for a reflective surface in the ROI of an imaged real-world view of an ambient scene and registered to the pixel cluster to find a small target wherein the first mode is different from the second mode.

9. The computer readable medium of claim 8, wherein the pixel cluster is represented on the display device as image data representative of a thermal scale of infrared imaging.

10. The computer readable medium of claim 8, wherein the pixel cluster is represented on the display device as image data representative of a laser reflection in the imaged real-world view of the ambient scene.

11. The computer readable medium of claim 8, wherein the selected ROI is selected on a basis of laser range path correction (LRPC) wherein the ROI becomes a selected ROI on the target.

12. The computer readable medium of claim 8, wherein the program instructions to further cause when executed the one or more processors to, during mode 2:
 determine a direction of movement of the pixel cluster of the selected ROI by image tracking; and
 further sweep a line-of-sight (LOS) of an area in or around the selected ROI to expand an area of search of reflective surface portions in the determined direction of movement, by the laser ranging system.

13. The computer readable medium of claim 12, wherein the program instructions to further cause when executed the one or more processors to, during mode 2:
 estimate a range of the pixel cluster in the selected ROI as registered in the image;
 in response to the estimated range, determine a dither size for conducting laser ranging in the second mode; and
 conduct laser ranging based on the determined dither size and a dither profile.

14. The computer readable medium of claim 8, wherein the laser ranging in the second mode is initialized to steer the laser photodetector of the gimbal to the center of the ROI.

15. A computer-implemented method comprising:
 receiving, by a processor of a computing system, selection of a region-of-interest (ROI) having a pixel cluster displayed on a display device;
 causing, by the processor, laser ranging aligned to an optical line-of-sight using a laser ranging system in the first mode of an extended laser active ranging (ELAR) procedure;
 determining, by the processor, whether a laser ranging reflection (LRR) signal is received by a laser photodetector of a gimbal during the first mode; and
 if the LRR signal is not received, performing, by the processor, a second mode of the ELAR procedure, via the laser ranging system, initialized to a center of the selected ROI to search for a reflective surface in the ROI of an imaged real-world view of an ambient scene and registered to the pixel cluster to find a small target with the reflective surface, wherein the first mode is different from the second mode.

16. The method of claim 15, wherein the pixel cluster is represented on the display device as image data representative of a thermal scale of infrared imaging or a laser reflection in the imaged real-world view of the ambient scene.

17. The method of claim 15, wherein the selected ROI is selected on a basis of laser range path correction (LRPC) wherein the ROI becomes a selected ROI on the target.

18. The method of claim 15, wherein during mode 2:
 determining, by the processor, a direction of movement of the pixel cluster of the selected ROI by image tracking; and
 further sweeping, by the processor, a line-of-sight (LOS) of an area in or around the selected ROI to expand an area of search of reflective surface portions in the determined direction of movement, by the laser ranging system.

19. The method of claim 18, wherein during mode 2:
 estimating a range of the pixel cluster in the selected ROI as registered in the image;
 in response to the estimated range, determining a dither size for conducting laser ranging in the second mode; and
 conducting laser ranging based on the determined dither size and a dither profile.

20. The method of claim 15, wherein the laser ranging in the second mode is initialized to steer the laser photodetector of the gimbal to the center of the ROI.

* * * * *